United States Patent
Zielinsky

(10) Patent No.: US 8,070,206 B2
(45) Date of Patent: Dec. 6, 2011

(54) TAILGATE LOWERING APPARATUS AND METHOD

(76) Inventor: Cary Russell Zielinsky, Liberty, UT (US)

( * ) Notice: Subject to any disclaimer, the term of this patent is extended or adjusted under 35 U.S.C. 154(b) by 178 days.

(21) Appl. No.: 12/582,778

(22) Filed: Oct. 21, 2009

(65) Prior Publication Data

US 2011/0089711 A1 Apr. 21, 2011

(51) Int. Cl.
*E05C 17/30* (2006.01)
*E05C 17/36* (2006.01)
*B60J 5/10* (2006.01)

(52) U.S. Cl. .............................. 296/57.1; 296/106; 16/82

(58) Field of Classification Search ................... 296/50, 296/57.1, 59, 146.8, 180.5, 106; 16/82; 24/298, 24/302
See application file for complete search history.

(56) References Cited

U.S. PATENT DOCUMENTS

| | | | | |
|---|---|---|---|---|
| 563,173 A | * | 6/1896 | Herriman | 296/59 |
| 659,575 A | * | 10/1900 | Carpenter | 296/59 |
| 5,934,727 A | * | 8/1999 | Storc et al. | 296/26.11 |
| 6,267,429 B1 | * | 7/2001 | Kuzmich et al. | 296/50 |
| 6,450,559 B1 | * | 9/2002 | Renke | 296/57.1 |
| 6,951,358 B1 | * | 10/2005 | Ousley et al. | 296/57.1 |

OTHER PUBLICATIONS

2005 Chevrolet Colorado Owner Manual, General Motors Corporation, pp. 1, 2, 83, 92 and 93.

* cited by examiner

*Primary Examiner* — Glenn Dayoan
*Assistant Examiner* — Gregory Blankenship
(74) *Attorney, Agent, or Firm* — Warren M. Pate, LLC

(57) ABSTRACT

A method for lowering a tailgate is disclosed. The method may include selecting a vehicle comprising a first side, a second side, a tailgate, and a first tailgate support. The tailgate may be connected to pivot with respect to the first and second sides through a range of motion. The first tailgate support may have a first end connected to the first side and a second end connected to tailgate. The method may further include detaching the first end of the first tailgate support from first side of the vehicle. Once a first extension link is selected, the first end of the first tailgate support may be connected to the first extension link. The first extension link may be connected to the first side. Once installed, the extension link may effectively lengthen the tailgate support, permitting the tailgate to hang lower than ninety degrees from its closed position.

20 Claims, 12 Drawing Sheets

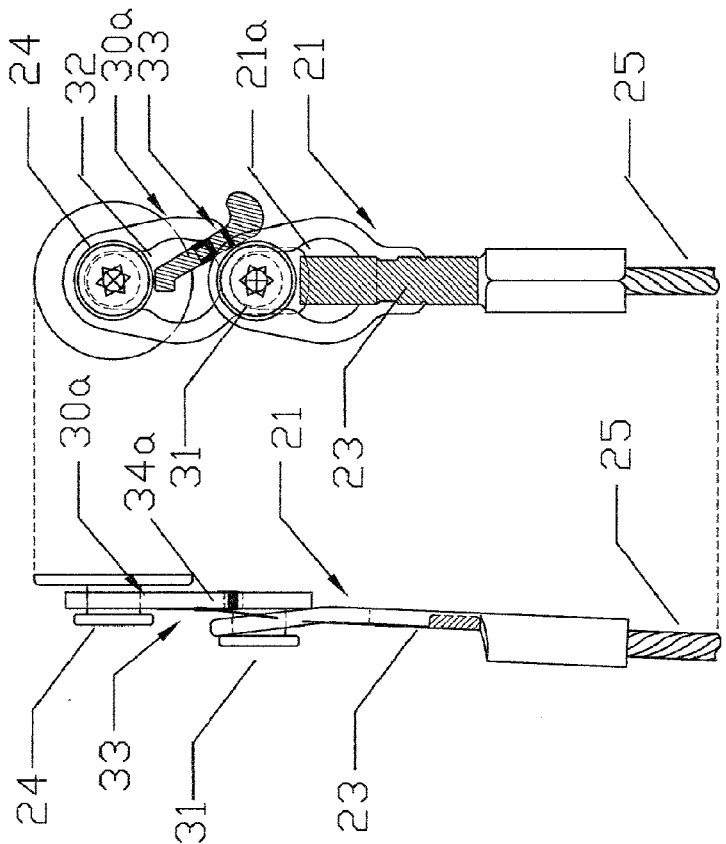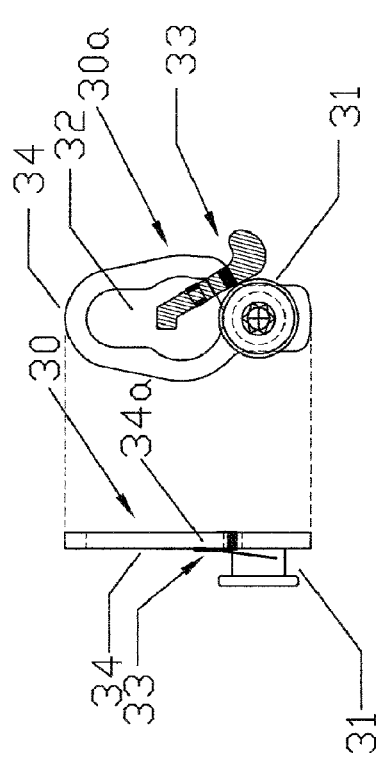

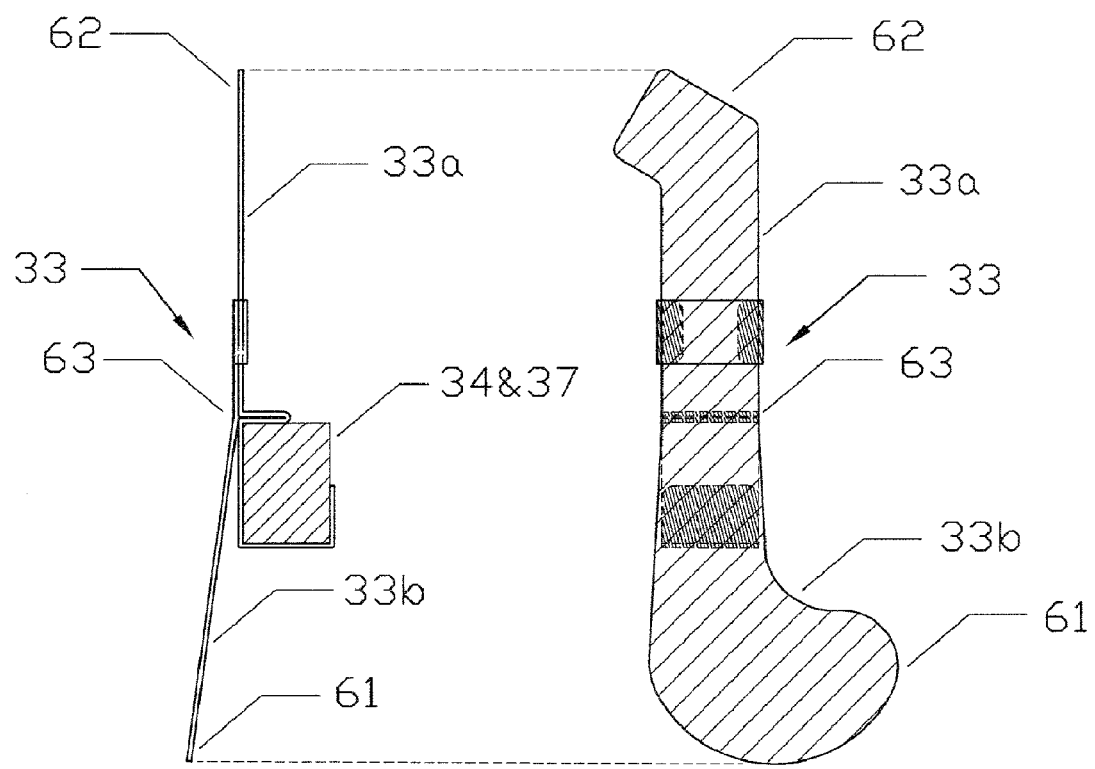

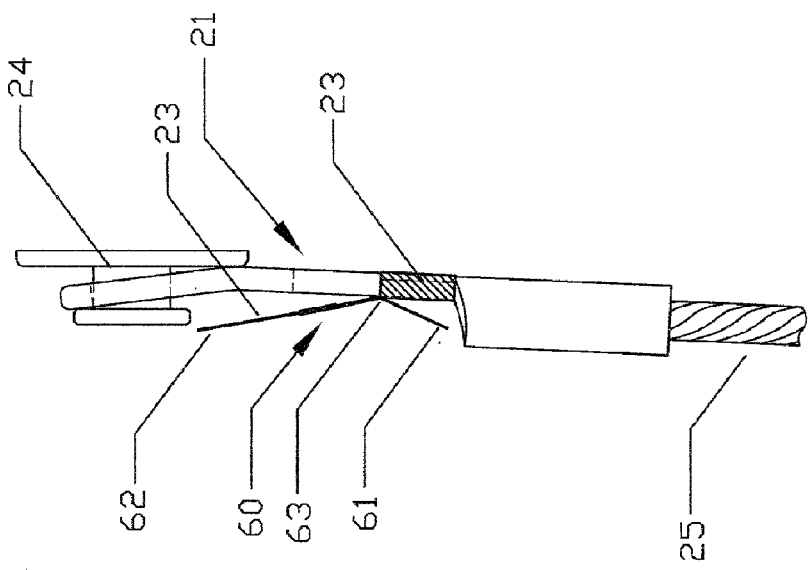
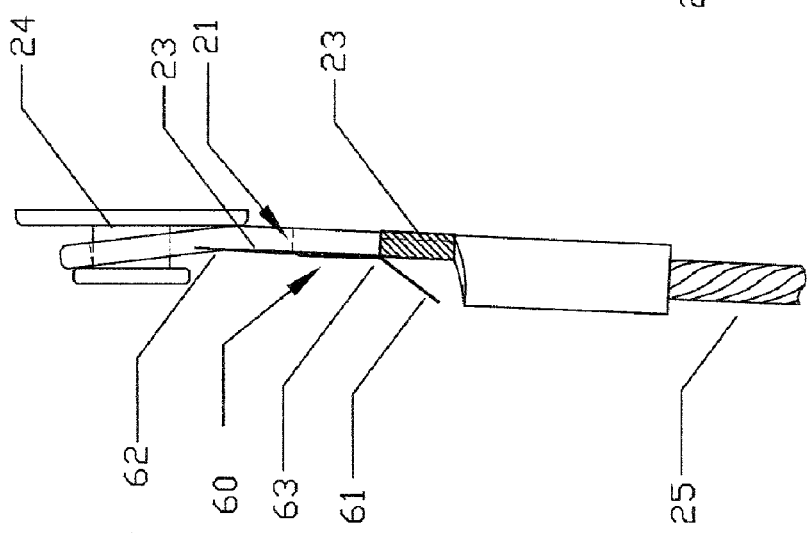
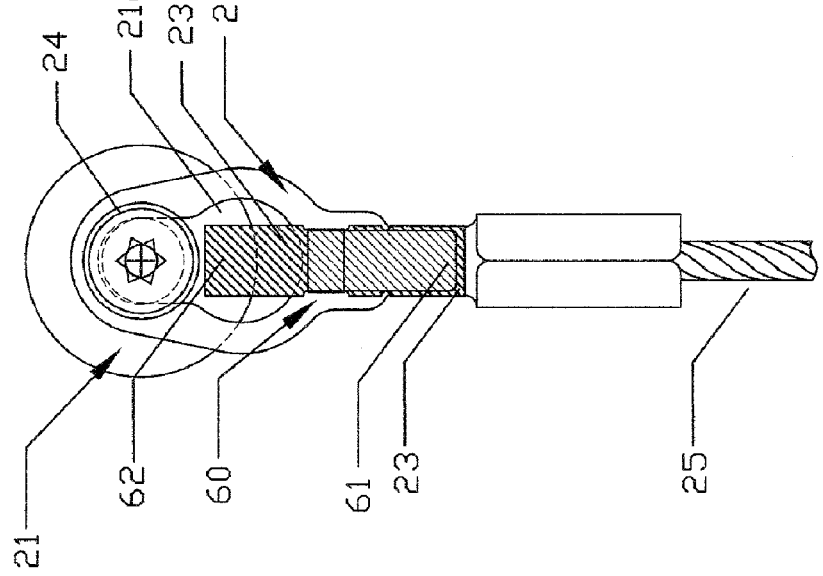

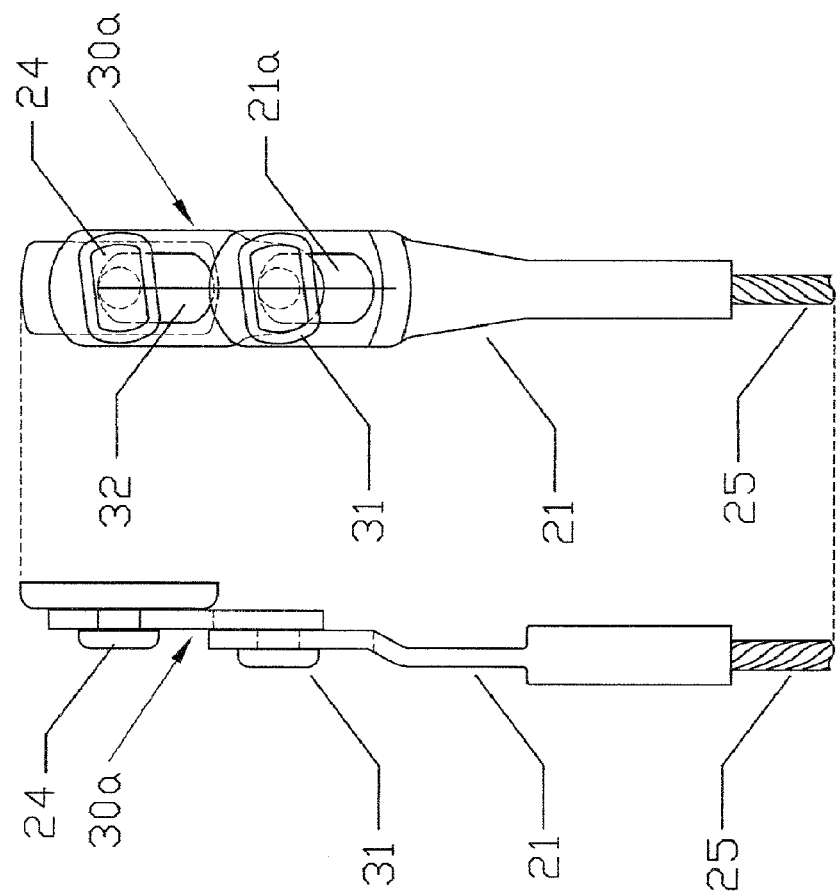
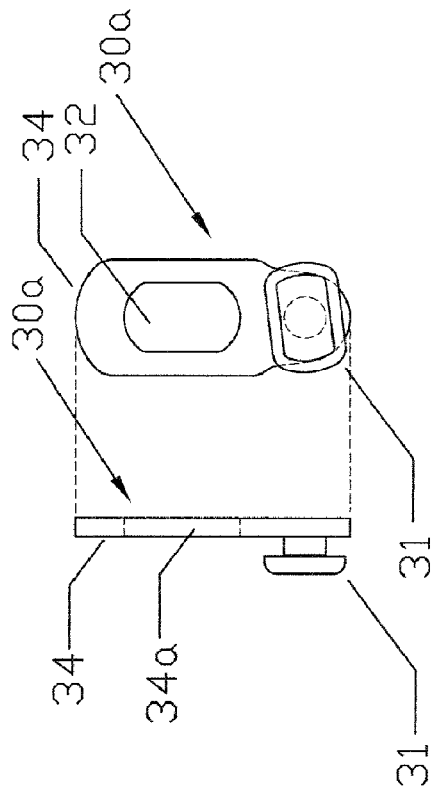
Fig 14
Fig 13

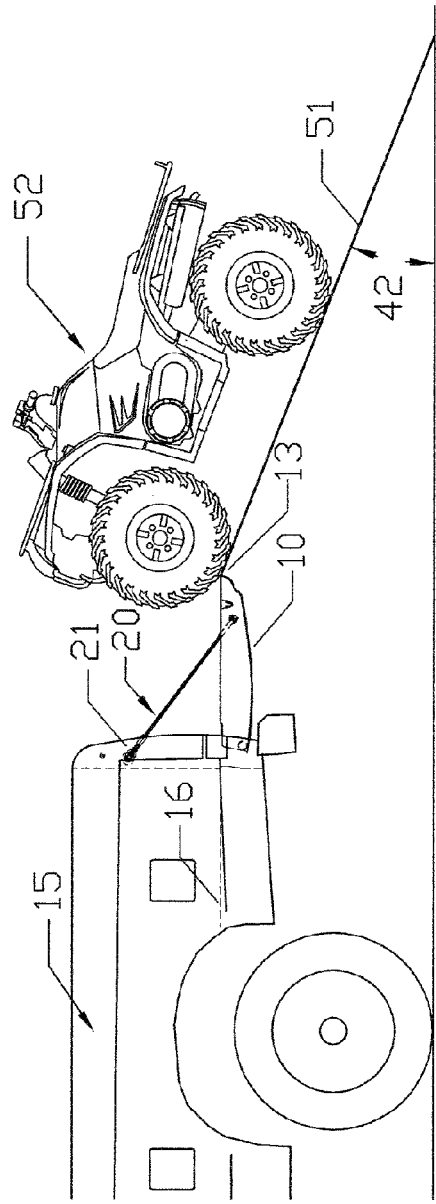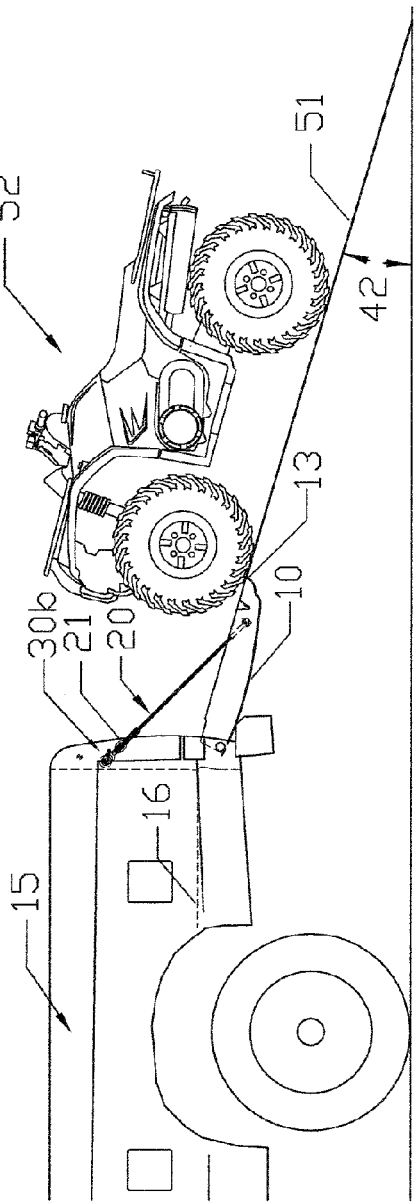

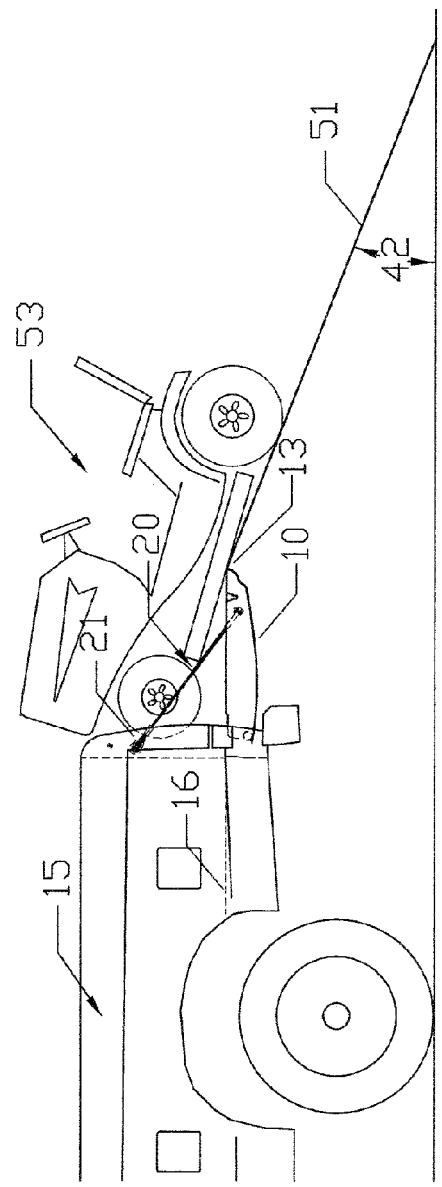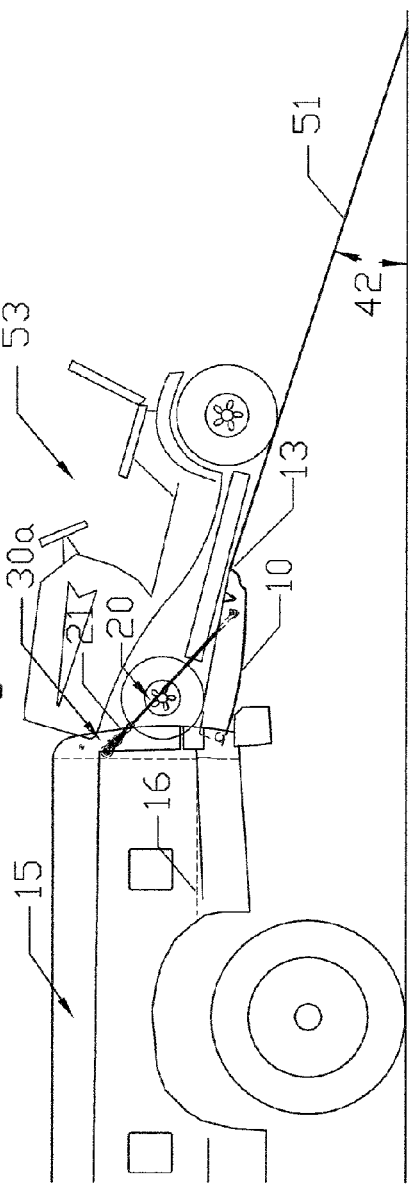

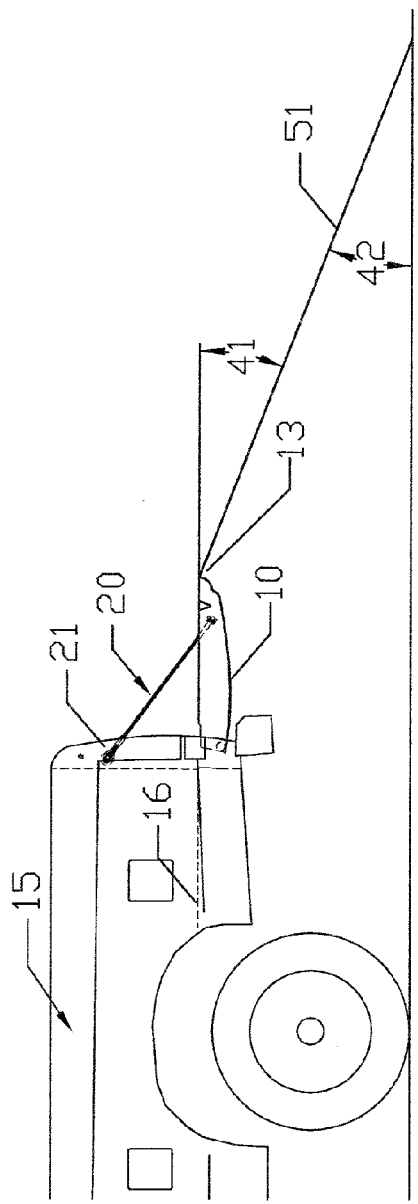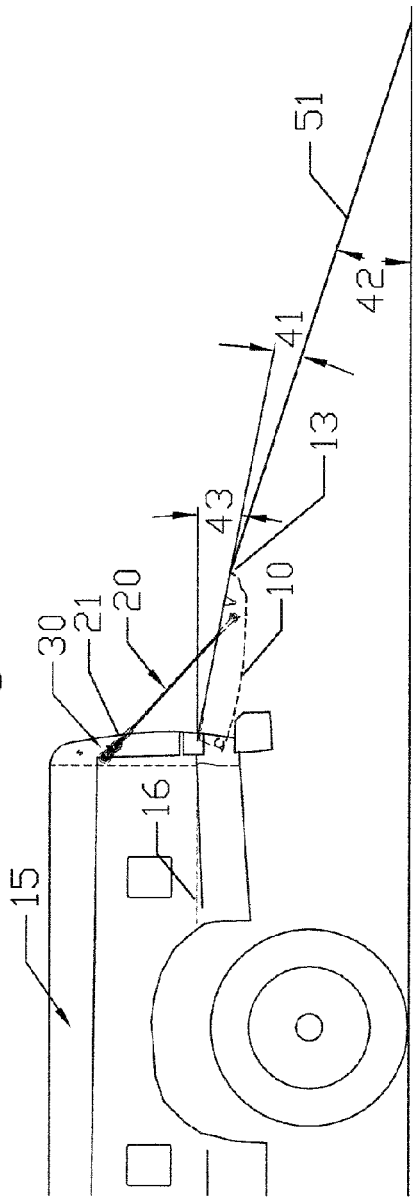

TAILGATE LOWERING APPARATUS AND METHOD

BACKGROUND

1. Field of Invention

This invention relates to motor vehicles and utility trailers, and more particularly to apparatus and methods for easily lowering a tailgate to a position lower than the standard open position, while retaining the tailgate's external appearance and full load carrying capacity.

2. Prior Art

In certain situations, it may be desirable to have a low loading height on a vehicle. In the past, attempts to lower vehicle loading height have focused in two primary areas. First, attempts have been made to lower the bed height of certain vehicles. While this may work well for trailers and special purpose vehicles, it is problematic for multi-use vehicles like pickup trucks, which have certain structural limitations and clearance requirements. Second, attempts have been made to add hoists to vehicles. While hoists neutralize the need for a lower loading height by simply lifting the load for the user, they are typically large, heavy, and expensive. Thus, neither of these two areas of improvement is particularly helpful for the average pickup truck user.

Currently, many vehicles, including pickup trucks, have tailgates. However, a typical tailgate is of no assistance in lowering vehicle loading height. Conventional tailgates pivot between a closed position and an open position. The open position is typically ninety degrees of rotation from the closed position. Accordingly, a typical tailgate in the open position forms an extension to the bed of the vehicle. Thus, the loading height of a vehicle with a tailgate is typically the height of the bed.

In view of the foregoing, what is needed is an inexpensive and unobtrusive apparatus and method for lower the loading height of a vehicle like a common, everyday, pickup truck.

SUMMARY

The present invention relates to vehicles with tailgates such as, without limitation, pick-up trucks with tailgates that rotate about a horizontal pivot axis near a lower edge of the tailgate. Certain devices in accordance with the present invention provide an easy to install and easy to remove tailgate-lowering apparatus. When installed between conventional tailgate supports and a tailgate itself, such devices may extend the length of the conventional tailgate supports. They may, therefore, allow the tailgate to be used with the leading edge pivoted to a position lower than the conventional open position. This may be done while retaining the tailgates external appearance and full load carrying capacity.

In selected embodiments, a device in accordance with the present invention may be configured as an extension link. An extension link may comprise a fixed length link or an adjustable length link. The process of installing and removing extension links may be facilitated by keeper or lock release levers that allow the extension links to be removed without the use of a pry tool. In certain embodiments, keeper or lock release levers in accordance with the present invention may be easily retrofit to the detachable tailgate supports commonly found on most pickup trucks.

An extension link in accordance with the present invention may comprise a link body having proximate one end thereof a male stud that is identical to, or substantially a duplicate of, the attachment stud on the bed side wall of the vehicle. Proximate the other end, the link body may be formed to include a female aperture that is identical to, or substantially a duplicate of, the aperture on the detachable end of a conventional tailgate support. In certain embodiments, the aperture on the link body may cooperate with a spring keeper or lock to maintain a stud secured therewithin. Such a keeper may include a release lever supporting disengagement of a stud without the use of tools.

The distance on a link body between the stud and the aperture may be selected such that the extension link, when installed, permits the tailgate to rotate more than ninety degrees from the closed position, but not so far as to contact the vehicle bumper. In selected embodiments, an extension link may be constructed so that the length between the stud and aperture is adjustable. In such embodiments, a user may fine tune the extension link to provide just the right amount of lowering, given the particular dimensions and motion of the user's vehicle.

Devices in accordance with the present invention may provide and support tailgate lowering, while retaining the tailgate's appearance and preserving the other functionality provided by the tailgate. In selected embodiments, such devices may not require permanent modification of the vehicle. The changes made when installing such devices may be completely and easily reversible. A tailgate may be opened and closed with extension links installed. Accordingly, extension links and keeper release levers in accordance with the present invention may be well suited as aftermarket accessories.

By allowing a tailgate to open more than ninety degrees from its closed position, the loading height of the corresponding vehicle may be reduced. A lower loading height may reduce the incline angle of loading ramps commonly used to load items such as motorcycles, ATVs, small tractors, and the like. Reducing the incline of such ramps may make it easier and safer to load and unload such items. Additionally, a tailgate with a lower leading edge may support loading of items with low ground clearance (e.g., riding lawn mowers), which would normally hang on the leading edge of a conventional tailgate at the location where the ramps rest.

To maximize the benefit of lowering a tailgate to a position lower than the conventional open position, embodiments in accordance with the present invention may comprise systems or packages including a new bumper or a bumper relocation kit. These new bumpers or bumper relocation kits may accommodate a lower tailgate position than conventional bumpers. Moreover, extension links may be packaged or combined with paint protection padding that may be applied to the tailgate and bed side surfaces of a vehicle that the extension links or the detachable ends of the conventional tailgate support cable may contact when the tailgate is in the closed position. This padding may reduce or eliminate any adverse effects of an extension link.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 5 shows detailed right side elevation and front elevation views of one embodiment of a fixed length extension link in accordance with the present invention;

FIG. 6 shows detailed right side elevation and front elevation views of one embodiment of an adjustable length extension link in accordance with the present invention;

FIG. 7 shows detailed right side elevation and front elevation views of the fixed length extension link of FIG. 5 installed on a tailgate support in accordance with the present invention;

FIG. 8 shows detailed right side elevation and front elevation views of one embodiment of a spring keeper or lock and a keeper release lever for use in connection with an extension link in accordance with the present invention;

FIG. 9 is a front elevation view of a detachable clip end of a conventional tailgate support connected to a stud and fitted with one embodiment of a keeper release lever or first actuator in accordance with the present invention;

FIG. 10 is a right side elevation view of the stud, detachable clip end, and keeper release lever of FIG. 9 with the keeper or first lock in the first position;

FIG. 11 is a right side elevation view of the stud, detachable clip end, and keeper release lever of FIGS. 9 and 10 with the keeper release lever depressed or in the second position;

FIG. 13 shows detailed right side elevation and front elevation views of an alternate embodiment of a fixed length extension link in accordance with the present invention;

FIG. 14 shows detailed right side elevation and front elevation views of the extension link of FIG. 13 installed in between a stud and the detachable clip end of a tailgate support in accordance with the present invention;

FIG. 15 is a schematic diagram illustrating the loading of an ATV with a tailgate in a conventional open position;

FIG. 16 is a schematic diagram illustrating the loading of an ATV with a tailgate lowered in accordance with the present invention;

FIG. 17 is a schematic diagram illustrating the loading of a riding lawn mower with a tailgate in a conventional open position;

FIG. 18 is a schematic diagram illustrating the loading of a riding lawn mower with a tailgate lowered in accordance with the present invention;

FIG. 19 is a schematic diagram illustrating the break-over angle with a tailgate in a conventional open position; and FIG. 20 is a schematic diagram illustrating the break-over angle with a tailgate lowered in accordance with the present invention.

Figure 1:
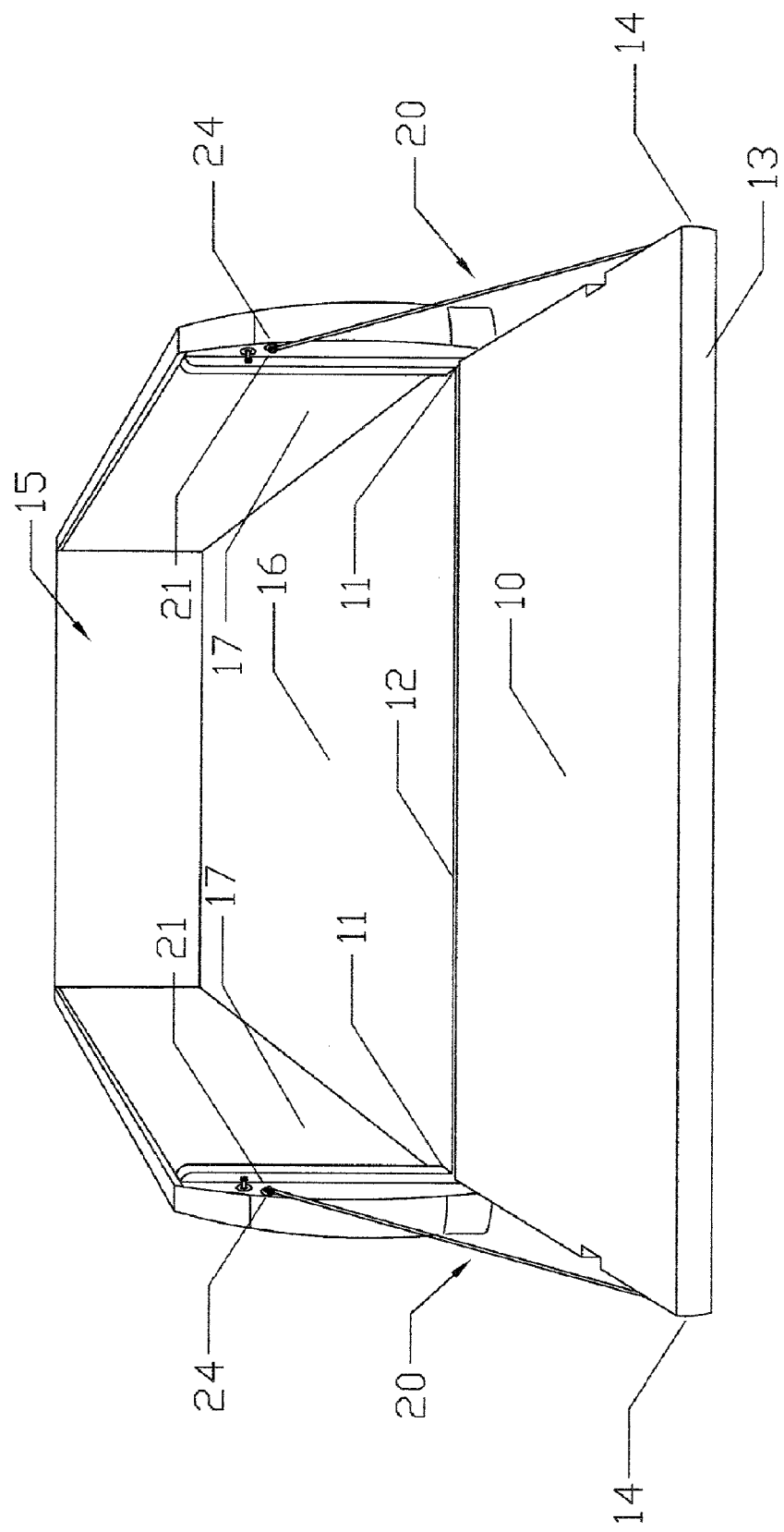
FIG. 1 is a perspective view of one embodiment of a truck bed with a tailgate in a conventional open position.
Figure 2:
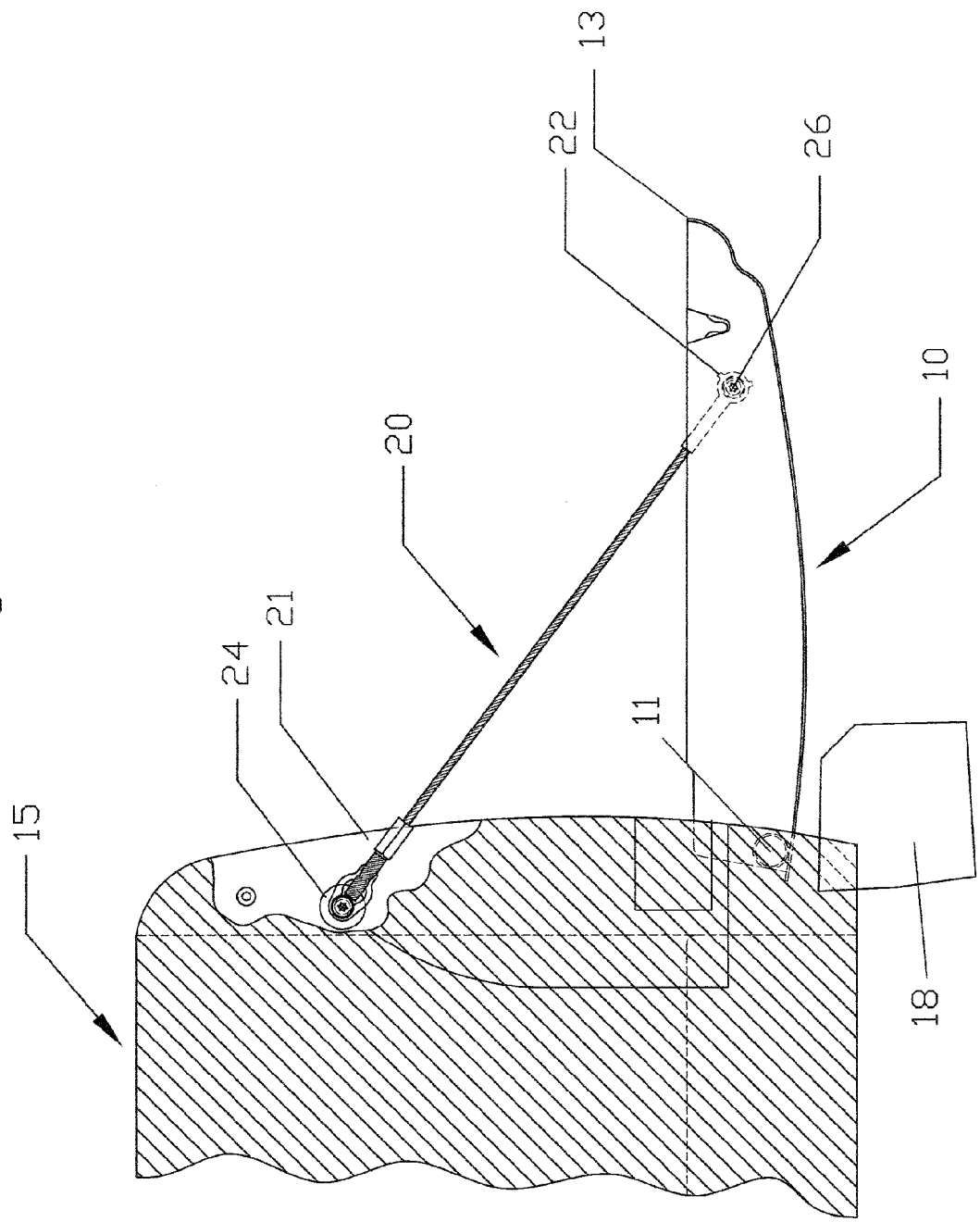
FIG. 2 is a left side elevation view of a conventional tailgate in the conventional open position.
Figure 3:
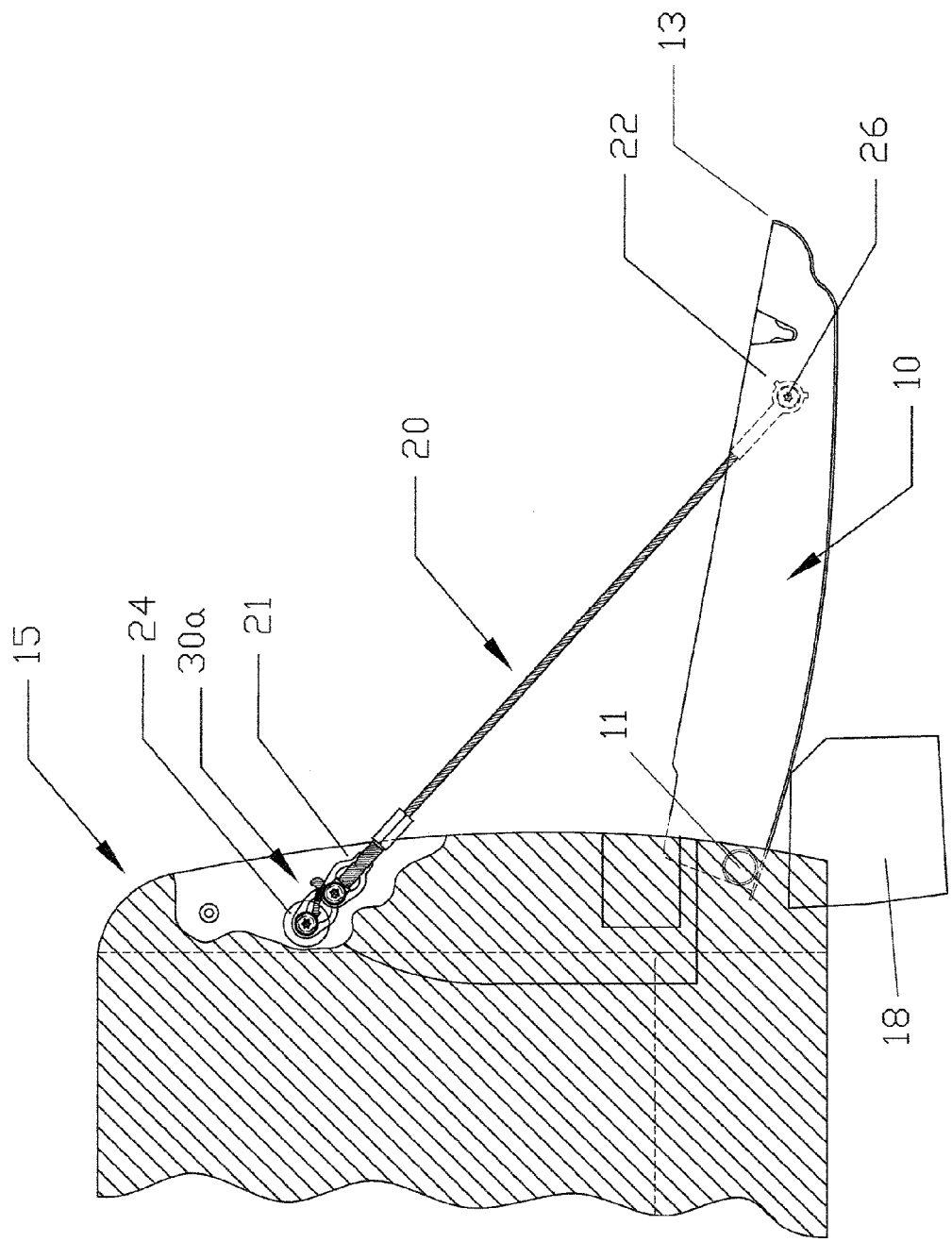
FIG. 3 is a left side elevation view of a tailgate in the fully open position using fixed length extension links in accordance with the present invention.
Figure 4:
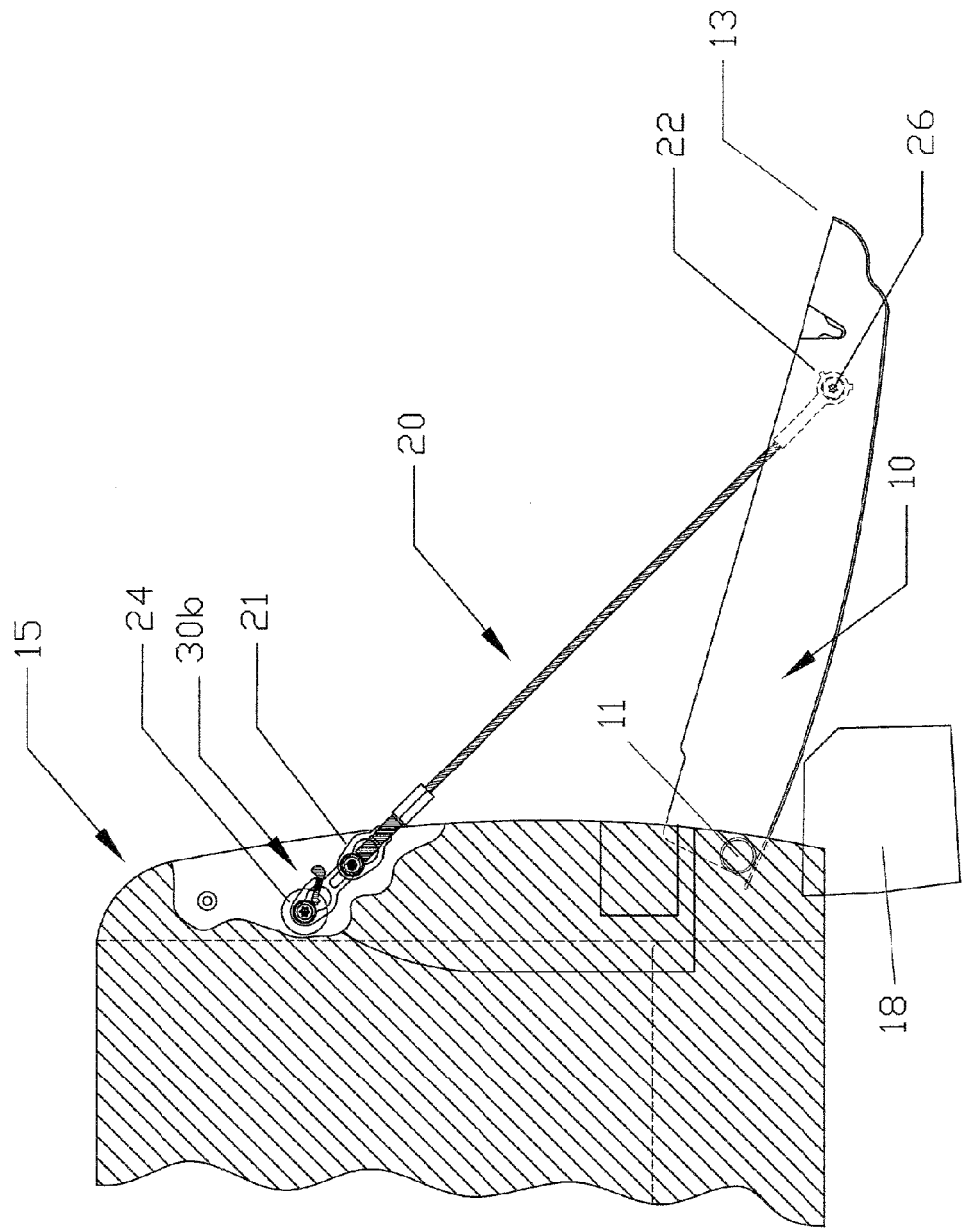
FIG. 4 is a left side elevation view of a tailgate in the fully open position using adjustable length extension links in accordance with the present invention.
Figure 12:
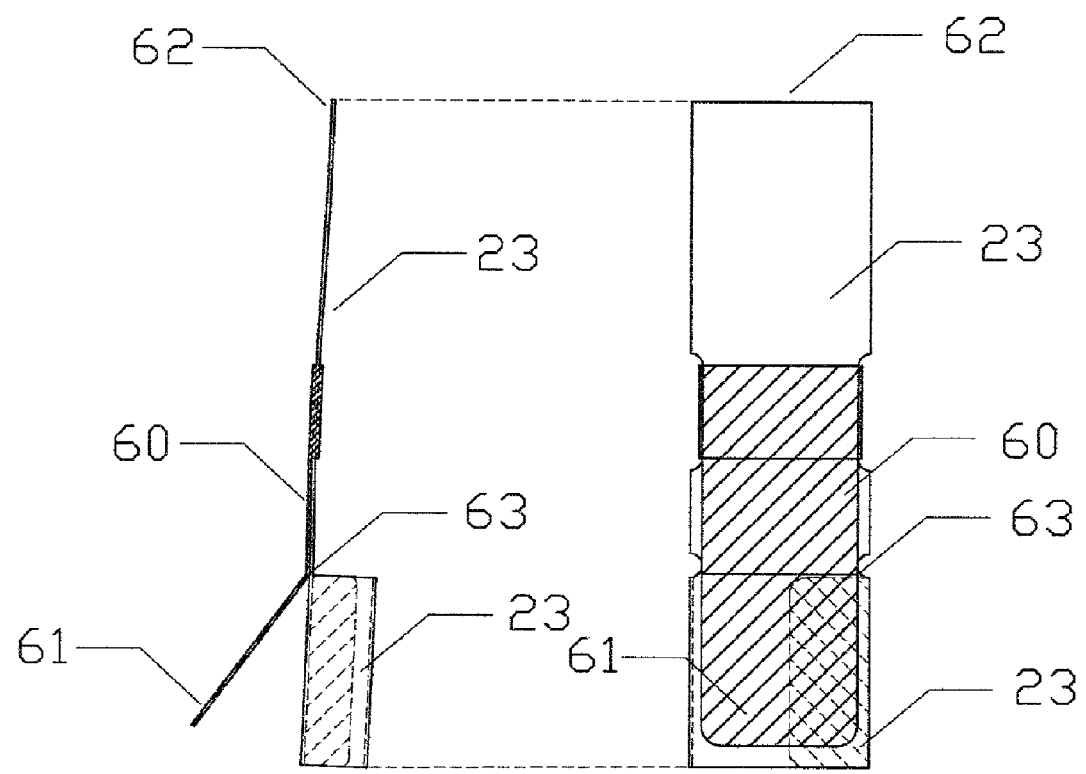
FIG. 12 shows detailed left side elevation and front elevation views of a detachable clip end of a tailgate support fitted with one embodiment of a keeper release lever in accordance with the present invention.

KEY FOR REFERENCE NUMERALS
CONTAINED IN DRAWINGS

10—tailgate
11—tailgate pivot
12—pivot edge
13—leading edge
14—tailgate side
15—bed of pickup truck
16—bed floor
17—side (e.g. bed side or side wall)
18—bumper
20—tailgate support
21—detachable clip end (e.g. first end)
21a—female end opening (e.g. first aperture)
22—fixed end (e.g. second end)
23—keeper (e.g. first lock)
24—stud (e.g. first stud)
25—cable
26—bolt
30—extension link
30a—fixed length extension link
30b—adjustable length extension link
31—male end stud (e.g. second stud)
32—female end opening (e.g. second aperture)
33—spring keeper assembly
33a—spring keeper (e.g. second lock)
33b—keeper release lever (e.g. second actuator)
34—fixed length extension link body
34a—side edge
36—male end stud nut
37—adjustable length extension link body
37a—side edge
38—stud locating opening
39—stud locating position
41—break-over angle
42—loading ramp angle
43—tailgate-decline angle
51—loading ramp
52—All Terrain Vehicle (ATV)
53—riding lawn mower
60—keeper release lever (e.g. first actuator)
61—thumb depressing end
62—keeper release end
63—release lever pivot point

DETAILED DESCRIPTION OF SELECTED
EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, in selected embodiments, the bed 15 of a vehicle may include a tailgate 10, two sides 17, two tailgate supports 20, and a bed floor 16. A tailgate 10 may be pivotable about a tailgate pivot 11 and have a pivot edge 12 and a leading or top edge 13. The tailgate 10 may be supported or suspended in the open position by the tailgate supports 20, which are typically cable assemblies comprising an easily detachable, clip end 21, a cable 25, and a fixed end 22.

The detachable clip ends 21 may comprise a female end opening 21a or aperture 21a and a keeper 23. These ends 21 may be attached to tailgate support studs 24 located on the bed sides 17. The fixed end 22 of a tailgate support 20 may be attached to a tailgate side 14 by a bolt 26. The tailgate 10 may be pivotable about a tailgate pivot 11 between a generally vertical closed or first position and an open or second position.

Referring to FIGS. 2 through 7, an extension link 30 in accordance with the present invention may form a tailgate-lowering apparatus 30. An extension link 30 may be placed between a tailgate support 20 and a tailgate support stud 24. Such an assembly may allow the leading or top edge 13 of a tailgate 10 to be lowered to a fully open position lower than a conventional open position, which is about ninety degrees of rotation from the closed position.

In selected embodiments, an extension link 30 may comprise a fixed length extension link 30a having a fixed length extension link body 34, a male end stud 31, a female end opening 32 or aperture 32, and a spring keeper or lock assembly 33. These components 31, 32, 33, 34 may be formed of any suitable materials. In certain embodiments, these components 31, 32, 33, 34 may be formed of metal.

A male end stud 31 may be nearly identical to, or substantially a duplicate of, a tailgate support stud 24 located on the bed side 17. The stud 31 may be located proximate one end of the link body 34. A female end opening 32 may be nearly identical to, or substantially a duplicate of, the opening on the detachable clip end 21 of a tailgate support 20. The opening 32 may be located proximate an end of the link body 34, opposite the stud 31. The distance between the stud 31 and the opening 32 may be selected such that when installed, a loaded tailgate 10 may not contact an underlying bumper 18.

In certain alternative embodiments, an extension link 30 may comprise an adjustable length extension link 30b having an adjustable length extension link body 37, a male end stud 31, a female end opening 32, and a spring keeper assembly 33. The male end stud 31 may be nearly identical to, or substantially a duplicate of, the tailgate support stud 24 located on the bed side 17. The stud 31 may be selectively located in one of a plurality of stud locating positions 39 distributed across or along a stud locating opening 38 or aperture 38. A male end stud nut 36 or other fastener may engage the stud 31 to lock it in place.

The female end opening 32 or aperture 32 of an adjustable length extension link 30b may be nearly identical to, or substantially a duplicate of, the opening on a detachable clip end 21 of a tailgate support 20. The opening 32 may be located proximate an end of the link body 37, opposite the stud 31. The distance between the stud 31 and the opening 32 may be selected such that when installed, a loaded tailgate 10 may not contact an underlying bumper 18. If after inspection, changes to the distance between the stud 31 and the opening 32 are necessary, the nut 36 may be loosen, the location of the stud 31 may be changed, and the nut 36 may be retightened. In this manner, extension links 30 of a single manufacture may be suitable for installation in a variety of vehicles of different dimensions and geometries.

Extension links 30 in accordance with the present invention may be configured to minimize any undesirable wear on the vehicle of a user. For example, in certain embodiments, the side edges 34a of an extension link 30 may be coated with a rubber like material to protect the paint on a corresponding vehicle.

Referring to FIG. 8, in certain embodiments, a spring keeper or lock assembly 33 may comprise a spring keeper 33a formed of spring steel and a keeper release lever 33b. A spring keeper assembly 33 may be mounted to either a fixed length extension link body 34 or an adjustable length extension link body 37. A spring keeper 33a may assist in maintaining the connection between an extension link 30 and a stud 24. A keeper release lever 33b may be formed in a manner such that when the thumb depressing end 61 is depressed, the keeper release end 62 may pivot about a release lever pivot point 63 and away from the stud 24. Accordingly, by depressing one end 61 of the spring keeper assembly 33, a corresponding extension link 30 may be easily removed from an associated stud 24.

Referring to FIGS. 9 through 12, to facilitate installation and removal of an extension link 30, selected embodiments in accordance with the present invention may include one or more keeper release levers 60. These keeper release levers 60 may be provided on OEM tailgate supports 20 or retrofit onto keepers 23 mounted on the detachable clip ends 21 of tailgate supports 20 that are already installed on a vehicle. A keeper release lever 60 may be formed so that when the thumb depressing end 61 is depressed the keeper release end 62 may pivot about the release lever pivot point 63 and away from the stud 24. Accordingly, by depressing one end 61 of the keeper release lever 60, a corresponding tailgate support 20 may be easily removed from an associated stud 24, 31.

Referring to FIGS. 13 and 14, while the embodiments described hereinabove have focused on tailgate supports 20 in the form of cable assemblies with detachable clip ends 22 and keepers 23, other embodiments in accordance with the present invention may be well suited to other commonly found forms of tailgate support members 20. For example, the extension link 30 illustrated in the provided detailed right side elevation and front elevation views may be a suitable alternative when such alternative studs 24 are encountered.

Referring to FIGS. 15 and 16, by allowing a tailgate 10 to open more than ninety degrees, embodiments in accordance with the present invention lower the leading or top edge 13 of the tailgate 10. This may result in a reduction in the incline of loading ramps 51 used when loading items such as motorcycles, ATV's 52, small tractors, or the like into the bed of a vehicle. By reducing the angle 42 of the loading ramps 51, it may be easier and safer to load and unload such items.

Referring to FIGS. 17 through 20, a tailgate 10 with a lower leading edge 13 may facilitate loading of items with low ground clearance (e.g., riding lawn mowers 53). Such items would normally hang on the leading edge 13 of a conventional tailgate 10 at the location where the loading ramps 51 rest. However, in embodiments in accordance with the present invention, when the leading edge 13 of the tailgate 10 is lowered below the plane of the bed 16, both the incline of the loading ramps 51 and the break-over angle 41 are reduced.

The break-over angle 41 may be defined as the angle between the plane of the tailgate 10 extended rearward and the angle of the loading ramp(s) 51. The angle that a tailgate 10 rotates down from the conventional open position to fully open position in accordance with the present invention may be referred to as the tailgate decline angle 43. Accordingly, between the tailgate decline angle 43 and the reduced break-over angle 41, embodiments in accordance with the present invention may provide a more gradual transition from ground to bed 16.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for modifying a tailgate of a vehicle, the method comprising:

selecting a vehicle comprising a first side, a second side, a tailgate, and a first tailgate support, the tailgate connected to pivot with respect to the first and second sides through a range of motion, the first tailgate support having a first end connected to the first side and a second end connected to tailgate;

detaching the first end of the first tailgate support from the first side;

obtaining a first extension link;

connecting, after the detaching, the first end of the first tailgate support to the first extension link; and connecting, after the detaching, the first extension link to the first side.

2. The method of claim 1, wherein the selecting comprises selecting the vehicle further comprising a second tailgate support having a first end connected to the second side and a second end connected to tailgate.

3. The method of claim 2, further comprising:

detaching the first end of the second tailgate support from the second side;

obtaining a second extension link;

connecting the first end of the second tailgate support to the second extension link; and connecting the second extension link to the second side.

4. The method of claim 1, further comprising closing, after connecting the first extension to the first side, the tailgate.

5. The method of claim 1, wherein the selecting comprises selecting the vehicle having the first side comprising a first stud.

6. The method of claim 5, wherein the selecting comprises selecting the vehicle having the first end of the first tailgate support comprising a first aperture sized to receive and engage the first stud.

7. The method of claim 6, wherein the obtaining comprises obtaining the first extension link comprising a second stud and a second aperture spaced a selected distance from the second stud.

8. The method of claim 7, wherein the obtaining comprises obtaining the first extension link having the second stud being substantially a duplicate of the first stud and the second aperture being substantially a duplicate of the first aperture.

9. The method of claim 7, wherein detaching comprises extracting the first stud from the first aperture.

10. The method of claim 9, wherein connecting the first end of the first tailgate support to the first extension link comprises inserting the second stud into the first aperture.

11. The method of claim 10, wherein connecting the first extension link to the first side comprises inserting the first stud into the second aperture.

12. A method for modifying a tailgate of a vehicle, the method comprising:

selecting a pickup truck comprising
a first side wall,
a second side wall,
a tailgate,
first and second tailgate supports each comprising a first end and a second end,
the tailgate connected to pivot with respect to the first and second side walls through a range of motion bounded at one end by a closed position and at the other end by an open position, the open position being about ninety degrees of rotation from the closed position, and
the first and second tail gate supports resisting rotation of the tailgate past the open position;

detaching, after the selecting, the first end of the first tailgate support and the first end of the second tailgate support from the first and second side walls, respectively;

connecting, after the detaching, the first end of the first tailgate support and the first end of the second tailgate support to first and second extension links, respectively; and connecting, after the detaching, the first and second extension links to the first and second side walls, respectively.

13. A vehicle comprising:

a first side having a first stud;

a second side;

a tailgate connected to pivot with respect to the first and second sides through a range of motion;

a tailgate support having a first end and a second end, the first end comprising a first aperture sized to receive and engage the first stud, the second end connected to tailgate;

an extension link comprising a second stud and a second aperture spaced a selected distance from the second stud;

the tailgate support further comprising the first aperture receiving and engaging the second stud; and the extension link further comprising the second aperture receiving and engaging the first stud.

14. The vehicle of claim 13, wherein the second stud is substantially a duplicate of the first stud and the second aperture is substantially a duplicate of the first aperture.

15. The vehicle of claim 13, wherein the first end of the tailgate support further comprises a first lock selectively movable between a first position and a second position, the first lock in the first position resisting removal of the second stud from within the first aperture, the first lock in the second position permitting removal of the second stud from within the first aperture.

16. The vehicle of claim 15, wherein the first lock is biased toward the first position.

17. The vehicle of claim 16, wherein the first end of the tailgate support further comprises a first actuator transitioning, when depressed, the first lock from the first position to the second position.

18. The vehicle of claim 17, wherein the extension link further comprises a second lock selectively movable between a third position and a fourth position, the second lock in the third position resisting removal of the first stud from within the second aperture, the second lock in the fourth position permitting removal of the first stud from within the second aperture.

19. The vehicle of claim 18, wherein the second lock is biased toward the third position.

20. The vehicle of claim 19, wherein the extension link further comprises a second actuator transitioning, when depressed, the second lock from the third position to the fourth position.

* * * * *